United States Patent
Tucci

(10) Patent No.: US 8,527,437 B1
(45) Date of Patent: Sep. 3, 2013

(54) METHOD FOR DRIVING STARTING QUANTUM STATE TO TARGET ONE

(76) Inventor: Robert R. Tucci, Woburn, MA (US)

( * ) Notice: Subject to any disclaimer, the term of this patent is extended or adjusted under 35 U.S.C. 154(b) by 519 days.

(21) Appl. No.: 12/924,767

(22) Filed: Oct. 5, 2010

(51) Int. Cl.
*G06F 15/18* (2006.01)

(52) U.S. Cl.
USPC .......................................................... 706/14

(58) Field of Classification Search
USPC .......................................... 706/12, 14, 45, 62
See application file for complete search history.

(56) References Cited

U.S. PATENT DOCUMENTS

| | | | |
|---|---|---|---|
| 6,317,766 B1 | 11/2001 | Grover | |
| 6,456,994 B1 * | 9/2002 | Tucci | 706/52 |
| 7,028,275 B1 | 4/2006 | Chen et al. | |
| 7,620,672 B2 * | 11/2009 | Tucci | 708/100 |
| 2007/0162262 A1 * | 7/2007 | Tucci | 703/1 |

OTHER PUBLICATIONS

"Quantum Mechanics Helps in Searching for a Needle in a Haystack", by Lov. K Grover, in Phys. Rev. Letters vol. 79, No. 2, pp. 325-328, published on Jul. 1997.

* cited by examiner

*Primary Examiner* — David Vincent

(57) ABSTRACT

We describe a method for using a classical computer to generate a sequence of elementary operations (SEO) that can be used to operate a quantum computer. The SEO drives as near as desired, in an efficient way, a starting quantum state to a target one.

20 Claims, 5 Drawing Sheets

$$|Fin\rangle = R_{beg}^{(N_{ste})} R_{tar} \cdots R_{beg}^{(2)} R_{tar} \cdot R_{beg}^{(1)} R_{tar} \cdot R_{beg}^{(0)} R_{tar} |s'\rangle \quad 201$$

$$R_{beg}^{(j)} = \exp(i\,\alpha_j |s'\rangle\langle s'|) \quad 202$$

$$R_{tar} = \exp(i\,\Delta\lambda |t\rangle\langle t|) \quad 203$$

$$\gamma = 2\,\arccos(|\langle s'|t\rangle|) \quad 204$$

$$e^{i\alpha}|Fin\rangle \approx |t\rangle \quad 205$$

Figure 2

$$|\text{Fin}\rangle = -\boxed{R_{beg}^{(N_{ste})} R_{tar}} \cdots \boxed{R_{beg}^{(2)} R_{tar}} \boxed{R_{beg}^{(1)} R_{tar}} \boxed{R_{beg}^{(0)} R_{tar}} -|s'\rangle$$
201

$$R_{beg}^{(j)} = \exp(i\,\alpha_j\,|s'\rangle\langle s'|) \quad 202$$

$$R_{tar} = \exp(i\,\Delta\lambda\,|t\rangle\langle t|) \quad 203$$

$$\gamma = 2\arccos(|\langle s'|t\rangle|) \quad 204$$

$$e^{i\alpha}|\text{Fin}\rangle \approx |t\rangle \quad 205$$

Figure 3

```
%%%%%%%%%%%%%%%%%%%%%%%%%%%%%%%%%%%%%%%%%%%%%%%%%%%%%%%%
% afga.m
%%%%%%%%%%%%%%%%%%%%%%%%%%%%%%%%%%%%%%%%%%%%%%%%%%%%%%%% g0_degs = 27  %g0 stands for gamma
del_lam_degs = 90
num_steps = 21 fi = fopen ("afga.txt", "w", "native");
fprintf(fi, "gamma(degs) = %10.4e\n", g0_degs);
fprintf(fi, "del_lam(degs) = %10.4e\n", del_lam_degs);
fprintf(fi, "num_steps = %i\n", num_steps);

g0 = (pi/180)*g0_degs;
del_lam = (pi/180)*del_lam_degs;
sg0 = sin(g0);
cg0 = cos(g0);
slam = sin(del_lam);
clam = cos(del_lam);
vz = [0;0;1];
vs0 = [sg0;0;cg0];

vs = vs0;
vr = afga_rot(vz, -del_lam, vs);
g_in = g0;
[g_out, alpha] = afga_step(g_in, g0, del_lam);

fprintf(fi,"j\tgam_j(degs)\talp_j(degs)\tvr_x\tvr_y\tvr_z\tvs_x\tvs_y\tvs_z\n");

for j=0:num_steps
    fprintf(fi,"%i\t", j);
    fprintf(fi,"%10.4e\t", g_in*180/pi);
    fprintf(fi,"%10.4e\t", alpha*180/pi);
    fprintf(fi,"%10.4e\t%10.4e\t%10.4e\t", vr(1), vr(2), vr(3));
    fprintf(fi,"%10.4e\t%10.4e\t%10.4e\n", vs(1), vs(2), vs(3));

vs = afga_rot(vs0, -alpha, vr);
    vr = afga_rot(vz, -del_lam, vs);
    g_in = g_out;
    [g_out, alpha] = afga_step(g_in, g0, del_lam);
endfor
fclose(fi);
```

Figure 4

```
%%%%%%%%%%%%%%%%%%%%%%%%%%%%%%%%%%%%%%%%%%%%%%%%%%%%%%
% afga_rot.m
%This function is called by afga.m
%It rotates a vector r
%by an angle theta about the axis a.
%r and a must be unit R^3 vectors.
%%%%%%%%%%%%%%%%%%%%%%%%%%%%%%%%%%%%%%%%%%%%%%%%%%%%%% function r_new = afga_rot(a, theta, r)
r_new = a*(a'*r)+ cross(a, r)*sin(theta) +(r - (a'*r)*a)*cos(theta);

%%%%%%%%%%%%%%%%%%%%%%%%%%%%%%%%%%%%%%%%%%%%%%%%%%%%%%
% afga_step.m
%This function is called by afga.m
%%%%%%%%%%%%%%%%%%%%%%%%%%%%%%%%%%%%%%%%%%%%%%%%%%%%%% function [g_out, alpha] = afga_step(g_in, g0, del_lam)

cgin = cos(g_in);
sgin = sin(g_in);
cg0 = cos(g0);
sg0 = sin(g0);
cg0minus = cos(g0 - g_in);
sg0minus = sin(g0 - g_in);
clam = cos(del_lam);
slam = sin(del_lam);
rjs = cg0*cgin + sg0*sgin*clam;

angle_rjs = atan2(sqrt(1-rjs^2), rjs);
dg = -g0 + g_in + angle_rjs;
g_out = g_in - dg;

%alpha = asin(slam)*sgin)/sin(angle_rjs))
%this expression for alpha only works sometimes, because
%x and pi - x both have same sine x = sin(dg)*(cgin*sgin*(1-clam) + sg0minus*rjs) +
    cos(dg)*(cgin^2 +sgin^2*clam - cg0minus*rjs);
y = sin(g0 -g_in + dg)*sgin*slam;
alpha = atan2(y,x);
```

Figure 5

$$|\widetilde{\text{Fin}}\rangle = \boxed{\widetilde{R}_{\text{beg}}^{(N_{\text{stc}})} \widetilde{R}_{\text{tar}}} \cdots \boxed{\widetilde{R}_{\text{beg}}^{(2)} \widetilde{R}_{\text{tar}}} \boxed{\widetilde{R}_{\text{beg}}^{(1)} \widetilde{R}_{\text{tar}}} \boxed{\widetilde{R}_{\text{beg}}^{(0)} \widetilde{R}_{\text{tar}}} \begin{matrix} -|0^c\rangle \\ -|s'\rangle \end{matrix}$$

501

$$\boxed{\widetilde{R}_{\text{beg}}^{(j)}} \approx \begin{matrix} \text{———} & C \text{ qubits} \\ \boxed{R_{\text{beg}}^{(j)}} & N_B \text{ qubits} \end{matrix}$$

502

$$\boxed{\widetilde{R}_{\text{tar}}} \approx \begin{matrix} \text{———} & C \text{ qubits} \\ \boxed{R_{\text{tar}}} & N_B \text{ qubits} \end{matrix}$$

503

$$e^{i\alpha}|\widetilde{\text{Fin}}\rangle \approx \begin{matrix} -|0^c\rangle \\ -|t\rangle \end{matrix}$$

504

METHOD FOR DRIVING STARTING QUANTUM STATE TO TARGET ONE

CROSS REFERENCES TO RELATED APPLICATIONS

Not Applicable

STATEMENT REGARDING FEDERALLY SPONSORED RESEARCH AND DEVELOPMENT

Not Applicable

REFERENCE TO COMPUTER PROGRAM LISTING

A computer program listing appendix contained in a single compact disc (CD) is included herewith and incorporated by reference herein. The CD is in IBM-PC format and was burned with a computer running the Windows 98 operating system. The CD contains a single file titled quibbs1-4.txt, in ASCII format, of size 512 KBytes, burnt onto the CD on Oct. 3, 2010.

BACKGROUND OF THE INVENTION (A) Field of the Invention

The invention relates to a quantum computer; that is, an array of quantum bits (called qubits). More specifically, it relates to methods for using a classical computer to generate a sequence of operations that can be used to operate a quantum computer.

(B) Description of Related Art

Henceforth, we will allude to certain references by codes. Here is a list of codes and the references they will stand for.

Ref.GWiki is http://en.wikipedia.org/wiki/Grover's_algorithm

Ref.GOrig is "Quantum Mechanics Helps in Searching for a Needle in a Haystack", by Lov. K Grover, in Phys. Rev. Letters Vol. 79, Num. 2, pp. 325-328, published on July of 1997.

Ref.GPat is "Fast Quantum Mechanical Algorithms", U.S. Pat. No. 6,317,766, by Lov K. Grover Ref.TexasPat is "Quantum Circuit Design for Grover's Algorithm", U.S. Pat. No. 7,028,275, by G. Chen, Z. Diao, M. Zubairy Ref.GPi/3 is "A Different Kind of Quantum Search" by Lov Grover, arXiv:quant-ph/0503205

Ref.Toy "Multi-phase matching in the Grover algorithm" by F. M. Toyama, W. van Dijk, Y. Nogami, M. Tabuchi, Y. Kimura, arXiv:0801.2956

Ref.TucAfga is "An Adaptive, Fixed-Point Version of Grover's Algorithm" by R. R. Tucci, arXiv:1001.5200.

Ref.TucQuibbs2 is "Quibbs, a Code Generator for Quantum Gibbs Sampling" by R. R. Tucci, arXiv:1004.2205

This invention deals with quantum computing. A quantum computer is an array of quantum bits (qubits) together with some hardware for manipulating those qubits. Quantum computers with several hundred qubits have not been built yet. However, once they are built, it is expected that they will perform certain calculations much faster that classical computers. A quantum computer follows a sequence of elementary operations. The operations are elementary in the sense that they act on only a few qubits (usually 1, 2 or 3) at a time. Henceforth, we will sometimes refer to sequences as products and to operations as operators, instructions, steps or gates.

Furthermore, we will abbreviate the phrase "sequence of elementary operations" by "SEO". SEOs are often represented as quantum circuits. In the quantum computing literature, the term "quantum algorithm" usually means a SEO for quantum computers for performing a desired calculation. Some quantum algorithms have become standard, such as those due to Deutsch-Jozsa, Shor and Grover. One can find on the Internet many excellent expositions on quantum computing.

Henceforth, we will abbreviate the phrase "Grover's Algorithm" by GA.

The original GA (first proposed in Ref.GOrig, patented in Ref.GPat, discussed in Ref.GWiki) has turned out to be very useful in quantum computing. Many quantum algorithms rely on it. It drives a starting state towards a target state by performing a sequence of equal steps. By this we mean that each step is a rotation about the same fixed axis and by the same small angle. Because each step is by the same angle, the algorithm overshoots past the target state once it reaches it.

About 8 years after Ref.GOrig, Grover proposed in Ref.GPi/3 a "pi/3 fixed-point" algorithm which uses a recursion relation to define an infinite sequence of gradually diminishing steps that drives the starting state to the target state with absolute certainty.

Other workers have pursued what they refer to as a phase matching approach to GA. Ref.Toy is a recent contribution to that approach, and has a very complete review of previous related contributions.

In this invention, we describe what we call an Adaptive, Fixed-point, Grover's Algorithm (AFGA, like Afgha-nistan, but without the h).

Our AFGA resembles the original GA in that it applies a sequence of rotations about the same fixed axis, but it differs from the original GA in that the angle of successive rotations is different. Thus, unlike the original GA, our AFGA performs a sequence of unequal steps.

Our AFGA resembles the pi/3 GA in that it is a fixed-point algorithm that converges to the target, but it differs from the pi/3 GA in its choice of sequence of unequal steps.

Our AFGA resembles the phase-matching approach of Ref.Toy, but their algorithm uses only a finite number of distinct "phases", whereas our AFGA uses an infinite number. Unlike AFGA, the Ref.Toy algorithm is not guaranteed to converge to the target so it is not a true fixed-point algorithm.

Many quantum algorithms require a version of GA that works even if there is a large overlap between the starting state and the target state. The original GA only works properly if that overlap is very small. AFGA and the pi/3 GA do not have this small overlap limitation. However, AFGA is significantly more efficient than the pi/3 GA.

Previous patents Ref.GPat and Ref.TexasPat are based on the original GA. The inventor Tucci believes that the present invention is an important improvement on those past patents because it is based on AFGA rather than on the original GA. As explained already, contrary to the original GA, AFGA converges with absolute certainty to the target state, and it does not require a small overlap between the starting and target states.

The inventor Tucci first published a description of this invention on Jan. 28, 2010, in Ref.TucAfga. Later, Tucci discussed an application of this invention in Ref.TucQuibbs2.

BRIEF SUMMARY OF THE INVENTION

We refer to the algorithm of Ref.TucAfga as AFGA. A preferred embodiment of this invention is computer program that runs on a classical computer and acts as an AFGA code generator. By this we mean that it generates a SEO (Sequence of Elementary Operations) which implements AFGA, and can be used to operate a quantum computer. The SEO drives as near as desired, in an efficient way, a starting quantum state to a target one.

BRIEF DESCRIPTION OF THE DRAWINGS

FIG. 2 shows a quantum circuit generated by an AFGA code generator.

FIG. 3 shows Octave/Matlab code for a program called afga.m which calculates the sequence $\{\alpha_j\}_{j=0}^\infty$.

FIG. 4 shows Octave/Matlab code for functions afga_rot.m and afga_step.m which are called by the program given in FIG. 3.

FIG. 5 shows a variation of the quantum circuit of FIG. 2 which uses approximate gates.

DETAILED DESCRIPTION OF THE INVENTION

Figure 1:
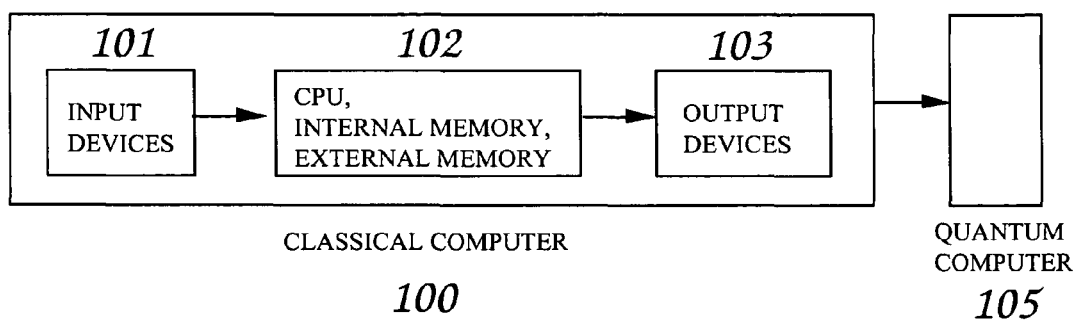
FIG. 1 shows a block diagram of a classical computer feeding data to a quantum computer.

This section describes a preferred embodiment of the invention and other possible embodiments of the invention.

A preferred embodiment of this invention is computer program that runs on a classical computer and acts as an AFGA code generator (or, equivalently, as a quantum circuit generator or as a SEO generator). By this we mean that it generates a SEO which implements AFGA and can be used to operate a quantum computer. The SEO drives as near as desired, in an efficient way, a starting quantum state to a target one.

This patent includes a Compact Disc with source code for a computer program, written in Java, called Quibbs1.4. Quibbs is described in Ref.TucQuibbs2. Quibbs generates a SEO which can be used to operate a quantum computer and thereby induce it to sample a probability distribution. The Quibbs source code contains a lot of code which is irrelevant to this invention, but it does contain in it an AFGA code generator which can be taken as an example of a useful application of this invention.

Henceforth we will say $|v\rangle$ is a unit vector if $\langle v|v\rangle = 1$. Consider two unit vectors $|v_1\rangle$ and $|v_2\rangle$ and let $D = ||v_1\rangle - |v_2\rangle|^2$. We will say that $|v_1\rangle$ and $|v_2\rangle$ are approximately equal to each other if $D/4$ is significantly smaller than one. We will say that they are equal if $D=0$. We will say that $|v_1\rangle$ and $|v_2\rangle$ are equal (respectively, approximately equal) up to a phase factor if there is some real number a such that $|v_1\rangle$ and $e^{i\alpha}|v_2\rangle$ are equal (respectively, approximately equal). We will say that $|v_1\rangle$ is an approximate eigenvector of an operator $\Omega$ if there exists a vector $|v_2\rangle$ which is an eigenvector of $\Omega$ and $|v_1\rangle$ is approximately equal to $|v_2\rangle$. We will say that two unitary operators $\Omega_1$ and $\Omega_2$ acting on the same vector space V of dimension dim(V) are approximately equal if $\mathrm{trace}[(\Omega_1-\Omega_2)(\Omega_1^\dagger-\Omega_2^\dagger)]/[4\dim(V)]$ is significantly smaller than one.

Consider any operator of the form $\Omega = \exp(i\alpha|v\rangle\langle v|)$ where $\alpha$ is a real number and where $|v\rangle$ is a unit vector. Note that $\Omega$ has only two distinct eigenvalues, namely $\exp(i\alpha)$ and 1. In fact, $|v\rangle$ is an eigenvector of $\Omega$ with eigenvalue $\exp(i\alpha)$, whereas any vector orthogonal to $|v\rangle$ has eigenvalue 1. The original GA (the one in Ref.GOrig) uses operators of the form $\Omega$, with $\alpha$ equal to $\pi$ or $-\pi$. The pi/3 GA (the one in Ref.GPi/3) uses operators of the form $\Omega$, with $\alpha$ equal to $\pi/3$ or $-\pi/3$. AFGA, on the other hand, uses operators of the form $\Omega$, with $\alpha$ equal to $\alpha_j$ or $\Delta\lambda$ where $\alpha_j$ tends to zero as j tends to infinity.

FIG. 1 is a block diagram of a classical computer feeding data to a quantum computer. Box 100 represents a classical computer. This invention includes software that runs inside Box 100. Box 100 comprises sub-boxes 101, 102, 103. Box 101 represents input devices, such as a mouse or a keyboard. Box 102 comprises the CPU, internal and external memory units. Box 102 does calculations and stores information. Box 103 represents output devices, such as a printer or a display screen. Box 105 represents a quantum computer, comprising an array of quantum bits and some hardware for manipulating the state of those qubits.

The remainder of this section is divided into 2 subsections. Subsection (A) describes a quantum circuit generated by an AFGA code generator. Subsection (B) discusses other possible embodiments of the invention.

(A) Quantum Circuit

In this section, we describe a quantum circuit generated by an AFGA code generator. For a more detailed description of the circuit, see Ref.TucAfga.

201 in FIG. 2 is a quantum circuit generated by an AFGA code generator. Let $N_B$ and $N_{ste}$ be some positive integers. Circuit 201 starts off in an initial state $|s'\rangle$ of $N_B$ qubits. This initial state is then subjected to $N_{ste}+1$ operators ("ste" stands for steps). We will next proceed to describe the nature of each of these $N_{ste}+1$ operators.

Each of the boxes in circuit 201 is a product of two operators, $R_{beg}^{(j)}$ and $R_{tar}$. "beg" stands for "beginning" and "tar" for "target".

Let $\Delta\lambda$ be a real number between 0 and $\pi$, and let $\{\alpha_j\}_{j=0}^\infty$ be a sequence of real numbers. $\Delta\lambda$ can be selected by the user. Ref.TucAfga explains how to calculate the angles $\alpha_j$ and FIG. 3 together with FIG. 4 show an Octave/Matlab program that calculates them explicitly.

Equation 202 defines $R_{beg}^{(j)}$ in terms of the state $|s'\rangle$ and the angles $\alpha_j$. Equation 203 defines $R_{tar}$ in terms of the state $|t\rangle$ and the angle $\Delta\lambda$. Equation 204 defines an angle $\gamma$ which characterizes the overlap between states $|s'\rangle$ and $|t\rangle$. $\gamma$ must be in the interval $[0,\pi]$. It cannot be precisely $\pi$, or else $|s'\rangle$ and $|t\rangle$ will be exactly orthogonal in which case AFGA won't work. Equation 205 stipulates that the state $|FIN\rangle$ defined by Equation 201 must be approximately equal (up to a phase factor $e^{i\alpha}$) to state $|t\rangle$.

FIG. 3 shows Octave/Matlab code for a program called afga.m. FIG. 4 shows Octave/Matlab code for functions afga_rot.m and afga_step.m which are called by the program of afga.m. The first 3 lines of afga.m instantiate its 3 input parameters:

(a) g0_degs=$\gamma$ in degrees
(b) del_lam_degs=$\Delta\lambda$ in degrees
(c) num_steps=$N_{ste}$ Each time afga.m runs successfully, it outputs $\alpha_0, \alpha_1, \ldots, \alpha_{N_{ste}}$. It also outputs other quantities. For a detailed description of all the outputs of afga.m, see Ref.TucAfga.

(B) Other Embodiments

In this section, we describe other possible embodiments of the invention.

FIG. 5 shows an embodiment of the invention which is similar to the one in FIG. 2. Let c be a positive integer. 201 of embodiment FIG. 2 applies a sequence of $N_{ste}+1$ operators to a state $|s'\rangle$ of $N_B$ qubits. On the other hand, 501 of embodiment FIG. 5 applies a sequence of $N_{ste}+1$ operators to a state of $c+N_B$ qubits which is a tensor product of state $|0\rangle$ for the top c qubits and state $|s'\rangle$ for the bottom $N_B$ qubits. The extra c auxiliary qubits are used as scratch space. The Quibbs1.4 program (whose source code is in the Compact Disc included with this patent) in fact comprises an implementation of the embodiment of FIG. 5.

Each of the boxes in circuit 501 is a product of two operators, $\tilde{R}_{beg}^{(j)}$ and $\tilde{R}_{tar}$. According to equation 502, $\tilde{R}_{beg}^{(j)}$ is approximately equal to an operator which acts as the identity on the top c qubits and the operator $R_{beg}^{(j)}$ defined in 202 which acts only on the bottom $N_B$ qubits. Likewise, according to Equation 503, $\tilde{R}_{tar}$ can be approximated by an operator which acts as the identity on the top c qubits and the operator $R_{tar}$ defined in 203 which acts only on the bottom $N_B$ qubits. Equation 504 stipulates that the state defined by Equation 501 must be approximately equal (up to a phase factor) to a state which is a tensor product of |0> for each of the top c qubits and |t> for the bottom $N_B$ qubits.

As is done in Quibbs1.4, the operators $\tilde{R}_{beg}^{(j)}$ and $\tilde{R}_{tar}$ can be expressed as a SEO.

So far, we have described some exemplary preferred embodiments of this invention. Those skilled in the art will be able to come up with many modifications to the given embodiments without departing from the present invention. Thus, the inventor wishes that the scope of this invention be determined by the appended claims and their legal equivalents, rather than by the given embodiments.

I claim:

1. A method of operating a classical computer to calculate a total SEO, with the purpose of using said total SEO to operate a quantum computer, and to induce said quantum computer to drive a starting unit vector |s'> towards a target unit vector |t>, said method comprising the steps of:
    storing in said classical computer a data trove comprising a positive number $\epsilon$, and a data-set sufficient to determine |<s'|t>|,
    calculating using said classical computer and using said data trove, a sequence of unitary operators $U_0, U_1, U_2, \ldots, U_M$, wherein M depends on $\epsilon$, wherein there are unit vectors $|\Phi_1>$ and $|\Phi_2>$ such that if $ERR = \||v_1> - |v_2>|^2$ where $|v_1> = U_M \ldots U_1 U_0 |s'> \otimes |\Phi_1>$ and $|v_2> = |t> \otimes |\Phi_2>$, then $ERR \leq \epsilon$,
    calculating using said classical computer for each j=0,1, 2, ... M, a SEO corresponding to $U_j$, wherein said total SEO equals the product $\Sigma_M \ldots \Sigma_1 \Sigma_0$,
wherein for a multiplicity of j, $U_j$ is approximately equal to an operator of the special form $$A_j^\dagger \{\exp(\lambda_j |t_j><t_j|) \otimes B_j\} A_j$$

for some real number $\lambda_j$ not in the set $\{\pi/3, -\pi/3, \pi, -\pi\}$, some unit vector $|t_j>$, and some unitary operators $A_j$ and $B_j$.

2. The method of claim 1, wherein for almost all j, $U_j$ is approximately equal to an operator of said special form.

3. The method of claim 1, wherein for each j=0,1,2, ... M, said SEO $\Sigma_j$ has a number of elementary operations that scales polynomially in $N_B$.

4. The method of claim 1, further utilizing a quantum computer, comprising the additional step of:
    operating said quantum computer according to said total SEO.

5. The method of claim 1, wherein said sequence of unitary operators $U_0, U_1, \ldots U_M$ alternates between unitary operators that have $|s'> \otimes |\alpha>$ for some state $|\alpha>$, as approximate eigenvector, and unitary operators that have $|t> \otimes |\beta>$ for some state $|\beta>$, as approximate eigenvector.

6. A device that calculates a total SEO, with the purpose of using said total SEO to operate a quantum computer, and to induce said quantum computer to drive a starting unit vector |s'> towards a target unit vector |t>, said device comprising:
    a memory arranged to store a data trove comprising a positive number $\epsilon$, and a data-set sufficient to determine |<s'|t>|,
    a processor arranged to calculate using said data trove stored in said memory, a sequence of unitary operators $U_0, U_1, U_2, \ldots, U_M$, wherein M depends on $\epsilon$, and arranged to calculate for each j=0,1,2, ... M, a SEO $\Sigma_j$ corresponding to $U_j$, wherein there are unit vectors $|\Phi_1>$ and $|\Phi_2>$ such that if $ERR = \||v_1> - |v_2>|^2$ where $|v_1> = U_M \ldots U_1 U_0 |s'> \otimes |\Phi_1>$ and $|v_2> = |t> \otimes |\Phi_2>$, then $ERR \leq \epsilon$, wherein said total SEO equals the product $\Sigma_M \ldots \Sigma_1 \Sigma_0$,
wherein for a multiplicity of j, $U_j$ is approximately equal to an operator of the special form $$A_j^\dagger \{\exp(\lambda_j |t_j><t_j|) \otimes B_j\} A_j$$

for some real number $\lambda_j$ not in the set $\{\pi/3, -\pi/3, \pi, -\pi\}$, some unit vector $|t_j>$, and some unitary operators $A_j$ and $B_j$.

7. The device of claim 6, wherein for almost all j, $U_j$ is approximately equal to an operator of said special form.

8. The device of claim 6, wherein for each j=0,1,2, ... M, said SEO $\Sigma_j$ has a number of elementary operations that scales polynomially in $N_B$.

9. The device of claim 6, further comprising a quantum computer that operates according to said total SEO.

10. The device of claim 6, wherein said sequence of unitary operators $U_0, U_1, \ldots U_M$ alternates between unitary operators that have $|s'> \otimes |\alpha>$ for some state $|\alpha>$, as approximate eigenvector, and unitary operators that have $|t> \otimes |\beta>$ for some state $|\beta>$, as approximate eigenvector.

11. A method of operating a classical computer to calculate a total SEO, with the purpose of using said total SEO to operate a quantum computer, and to induce said quantum computer to drive a starting unit vector |s'> towards a target unit vector |t>, said method comprising the steps of:
    storing in said classical computer a data trove comprising a positive number $\epsilon$, and a data-set sufficient to determine |<s'|t>|,
    calculating using said classical computer and using said data trove, a sequence of unitary operators $U_0, U_1, U_2, \ldots, U_M$, wherein M depends on $\epsilon$, wherein there are unit vectors $|\Phi_1>$ and $|\Phi_2>$ such that if $ERR = \||v_1> - |v_2>|^2$ where $|v_1> = U_M \ldots U_1 U_0 |s'> \otimes |\Phi_1>$ and $|v_2> = |t> \otimes |\Phi_2>$, then $ERR \leq \epsilon$,
    calculating using said classical computer for each j=0,1, 2, ... M, a SEO $\Sigma_j$ corresponding to $U_j$, wherein said total SEO equals the product $\Sigma_M \ldots \Sigma_1 \Sigma_0$,
wherein if A is the subset of $\{0,1,2, \ldots M\}$ such that for all j in A, $U_j$ has only two distinct eigenvalues $\lambda_{1j}$ and $\lambda_{2j}$, and the product $\lambda_{1j} \lambda^*_{2j}$ is not in the set $\{e^{i\pi/3}, e^{-i\pi/3}, -1\}$, then A has 3 or more elements.

12. The method of claim 11, wherein A has about M elements.

13. The method of claim 11, wherein for each j=0,1,2, ... M, said SEO $\Sigma_j$ has a number of elementary operations that scales polynomially in $N_B$.

14. The method of claim 11, further utilizing a quantum computer, comprising the additional step of:
    operating said quantum computer according to said total SEO.

15. The method of claim 11, wherein said sequence of unitary operators $U_0, U_1, \ldots U_M$ alternates between unitary operators that have $|s'> \otimes |\alpha>$ for some state $|\alpha>$, as approximate eigenvector, and unitary operators that have $|t> \otimes |\beta>$ for some state $|\beta>$, as approximate eigenvector.

16. A device that calculates a total SEO, with the purpose of using said total SEO to operate a quantum computer, and to induce said quantum computer to drive a starting unit vector |s'> towards a target unit vector |t>, said device comprising:
    a memory arranged to store a data trove comprising a positive number $\epsilon$, and a data-set sufficient to determine |<s'|t>|,
    a processor arranged to calculate using said data trove stored in said memory, a sequence of unitary operators $U_0, U_1, U_2, \ldots, U_M$, wherein M depends on $\epsilon$, and arranged to calculate for each $j=0,1,2,\ldots M$, a SEO $\Sigma_j$ corresponding to $U_j$, wherein there are unit vectors $|\Phi_1\rangle$ and $|\Phi_2\rangle$ such that if $ERR = \||v_1\rangle - |v_2\rangle|^2$ where $|v_1\rangle = U_M \ldots U_1 U_0 |s'\rangle \otimes |\Phi_1\rangle$ and $|v_2\rangle = |t\rangle \otimes |\Phi_2\rangle$, then $ERR \leq \epsilon$, wherein said total SEO equals the product $\Sigma_M \ldots \Sigma_1 \Sigma_0$, wherein if A is the subset of $\{0,1,2,\ldots M\}$ such that for all j in A, $U_j$ has only two distinct eigenvalues $\lambda_{1j}$ and $\lambda_{2j}$, and the product $\lambda_{1j} \lambda^*_{2j}$ is not in the set $\{e^{i\pi/3}, e^{-i\pi/3}, -1\}$, then A has 3 or more elements.

17. The device of claim 16, wherein A has about M elements.

18. The device of claim 16, wherein for each $j=0,1,2,\ldots M$, said SEO $\Sigma_j$ has a number of elementary operations that scales polynomially in $N_B$.

19. The device of claim 16, further comprising a quantum computer that operates according to said total SEO.

20. The device of claim 16, wherein said sequence of unitary operators $U_0, U_1, \ldots U_M$ alternates between unitary operators that have $|s'\rangle \otimes |\alpha\rangle$ for some state $|\alpha\rangle$, as approximate eigenvector, and unitary operators that have $|t\rangle \otimes |\beta\rangle$ for some state $|\beta\rangle$, as approximate eigenvector.

* * * * *